(12) United States Patent
Mizuno

(10) Patent No.: US 8,092,314 B2
(45) Date of Patent: Jan. 10, 2012

(54) POWER TRANSMISSION STRUCTURE

(75) Inventor: Koichiro Mizuno, Kashiwara (JP)

(73) Assignee: Jtekt Corporation, Osaka (JP)

( * ) Notice: Subject to any disclaimer, the term of this patent is extended or adjusted under 35 U.S.C. 154(b) by 355 days.

(21) Appl. No.: 12/310,243

(22) PCT Filed: Sep. 12, 2007

(86) PCT No.: PCT/JP2007/067712
§ 371 (c)(1),
(2), (4) Date: Feb. 18, 2009

(87) PCT Pub. No.: WO2008/032729
PCT Pub. Date: Mar. 20, 2008

(65) Prior Publication Data
US 2009/0280913 A1   Nov. 12, 2009

(30) Foreign Application Priority Data

Sep. 13, 2006 (JP) ................................. 2006-248195

(51) Int. Cl.
*F16D 3/06* (2006.01)
*F16C 3/03* (2006.01)
(52) U.S. Cl. ........................... 464/162; 464/16; 180/384
(58) Field of Classification Search .................... 464/11, 464/16, 17, 134, 162; 180/384
See application file for complete search history.

(56) References Cited

U.S. PATENT DOCUMENTS

| | | | | |
|---|---|---|---|---|
| 3,123,990 A | * | 3/1964 | Freeman | 464/162 |
| 4,379,707 A | * | 4/1983 | Fisher | 464/162 |
| 5,772,520 A | * | 6/1998 | Nicholas et al. | 464/162 |
| 5,836,823 A | * | 11/1998 | Shellaberger | 464/162 |

FOREIGN PATENT DOCUMENTS

| | | |
|---|---|---|
| GB | 2040395 | 8/1980 |
| JP | 51-66651 | 5/1976 |
| JP | 51-66651 | 11/1979 |
| JP | 55-97529 | 7/1980 |
| JP | 56-39627 | 4/1981 |
| JP | 5-19661 | 3/1993 |
| JP | 7-32221 | 6/1995 |
| JP | 8-232969 | 9/1996 |
| JP | 8-254216 | 10/1996 |
| JP | 10-148217 | 6/1998 |
| JP | 11-325098 | 11/1999 |
| JP | 2001-74060 | 3/2001 |
| JP | 2001-330044 | 11/2001 |
| JP | 2004-359087 | 12/2004 |
| JP | 2004-359100 | 12/2004 |
| JP | 2004-360776 | 12/2004 |

* cited by examiner

*Primary Examiner* — Gregory Binda
*Assistant Examiner* — Josh Skroupa
(74) *Attorney, Agent, or Firm* — McGinn IP Law Group, PLLC

(57) ABSTRACT

An open end of a sleeve (spline-fitted to a male yoke) remote from a connecting portion of the male yoke is closed by a first lid member. A through hole is formed axially through the male yoke, and includes a cylindrical first passage portion, and a cylindrical second passage portion which is disposed at that side of the first passage portion close to the first lid member and is smaller in inner diameter than the first passage portion. A second lid member is disposed to close that open end of the through hole remote from the first lid member. Air vent holes are formed through the second lid member to extend in an axial direction, and are disposed so as to partially overlap with a portion of an inner peripheral surface of the first passage portion in the axial direction.

9 Claims, 2 Drawing Sheets

POWER TRANSMISSION STRUCTURE

TECHNICAL FIELD

This invention relates to a power transmission structure, and more particularly to a power transmission structure suited for use in a propeller shaft.

BACKGROUND ART

One conventional power transmission structure is disclosed in JP-A-2004-359100 Publication.

This power transmission structure comprises a male yoke, a first sleeve, a second sleeve, and a lid member. The male yoke includes a shaft portion, and a connecting portion integrally formed at one end of this shaft portion. The shaft portion of the male yoke and the first sleeve are spline-fitted to each other so as to slide relative to each other in an axial direction. An outer peripheral surface of that axial end portion of the first sleeve remote from the connecting portion is fixed by welding to an inner peripheral surface of one axial end portion of the second sleeve.

The lid member is fitted in and fixed to an inner peripheral surface of the axial end portion of the first sleeve remote from the connecting portion. Grease is sealed in a grease sealing space formed by an axial end face of the shaft portion, the lid member and the first sleeve. In this manner, the grease is applied to sliding contact portions of the shaft portion and first sleeve over entire areas thereof, thereby preventing seizure from developing on the sliding contact portions of the shaft portion and first sleeve.

An air vent hole is formed axially through a central portion of the lid member. In this power transmission structure, the air vent hole is thus formed through the lid member. Therefore, when the shaft portion slides in the axial direction relative to the first sleeve to move toward the lid member, so that the air pressure within the grease sealing space increases, the air is discharged from this grease sealing space to the interior of the second sleeve. On the other hand, when the shaft portion slides in the axial direction relative to the first sleeve to move away from the lid member, so that the air pressure within the grease sealing space becomes negative, the air is introduced into the grease sealing space from the second sleeve. Thus, the air pressure within the grease sealing space is prevented from excessively varying so that the shaft portion can easily slide in the axial direction relative to the first sleeve.

In the above conventional power transmission structure, however, the distance between the above sliding contact portions and the air vent hole is small, and therefore the grease is liable to leak into the second sleeve through the air vent hole. When the grease thus flows into the second sleeve, an eccentric load acts on the second sleeve, which invites a problem that the power transmission structure is liable to be subjected to whirling. And besides, since the grease leaks into the second sleeve through the air vent hole, there is encountered a problem that the grease can not be sufficiently distributed to the sliding contact portions over the entire areas thereof for a long period of time.

DISCLOSURE OF THE INVENTION

Problem to be Solved by the Invention

It is therefore an object of this invention to provide a power transmission structure in which lubricant is less liable to flow out of a lubricant sealing space, and also foreign matters are less liable to flow into the lubricant sealing space from the exterior, and seizure of sliding contact portions is less liable to occur, and furthermore the power transmission structure is less liable to be subjected to whirling.

Means for Solving the Problem

The above object has been achieved by a power transmission structure characterized in that the structure comprises:
a male yoke including a shaft portion having a spline, a through hole extending through the shaft portion generally at a center portion thereof in an axial direction, and a connecting portion integrally formed at one end of the shaft portion;
a sleeve having a spline which are spline-fitted to the spline of the shaft portion so as to allow a sliding movement between the male yoke and the sleeve;
a first lid member which closes that open end of the sleeve remote from the connecting portion of the male yoke, and is fixed to the sleeve; and
a second lid member which closes that open end of the through hole close to the connecting portion, and is fixed to the male yoke; and
the through hole includes:
a first passage portion; and
a second passage portion which is disposed at that side of the first passage portion close to the first lid member, an inner diameter of that end of the second passage portion close to the first passage portion being smaller than an inner diameter of that end of the first passage portion close to the first lid member; and
the second lid member has an air vent hole extending therethrough in the axial direction and disposed so as to partially overlap with an inner peripheral surface of the first passage portion in the axial direction.

Incidentally, in the present specification, the term "passage portion" (the first passage portion, the second passage portion, a third passage portion (described below), and a flaring passage portion (described below)) means a hole portion having a smooth inner peripheral surface.

In the invention, the open end of the sleeve remote from the connecting portion of the male yoke is closed or sealed by the first lid member, and therefore even when the male yoke slides in the axial direction to overlap the sleeve in a large amount, so that the volume of a lubricant sealing space formed by an axial end face of the male yoke, the first lid member and the sleeve is decreased, lubricant sealed in the lubricant sealing space will not leak from the open end of the sleeve remote from the connecting portion. Therefore, a sufficient amount of lubricant to prevent the seizure of sliding contact portions of the male yoke and sleeve can be caused to exist in the vicinity of these sliding contact portions for a long period of time, and therefore the seizure of the sliding contact portions can positively be prevented for a long period of time.

Furthermore, for example, in the case where a second sleeve is fixed by welding or other means to an outer peripheral surface of that axial end portion of the sleeve close to the first lid member, the lubricant will not leak into the second sleeve in contrast with a conventional structure, and therefore the whirling of the power transmission structure due to the leakage of the lubricant into the second sleeve will not occur.

Furthermore, in the invention, the second lid member has the air vent hole extending therethrough in the axial direction and disposed so as to partially overlap with the inner peripheral surface of the first passage portion in the axial direction. Therefore, the air can be caused to flow into the first passage portion from the exterior through this air vent hole, and also the air can be caused to flow from the first passage portion to the exterior. Therefore, the air pressure within the lubricant sealing space will not be excessively varied, and therefore the male yoke can be smoothly slid relative to the sleeve.

Furthermore, the through hole has the second passage portion disposed at that side of the first passage portion close to the first lid member, and that end of this second passage portion close to the first passage portion is smaller in inner diameter than that end of the first passage portion close to the first lid member. Therefore, even when mud and water intrude into the male yoke from the exterior through the air vent hole, the mud and water are less liable to intrude into the second passage portion, thus suppressing the arrival of the mud and water at the sliding contact portions of the male yoke and sleeve. And besides, water and mud are higher in specific gravity than the lubricant such as grease, and therefore the lubricant is less liable to leak to the exterior through the air vent hole, and also such water and mud once intruded into the first passage portion can be discharged to the exterior through the air vent hole by a centrifugal force produced by the rotation of the male yoke. Therefore, the lubricant applied to the sliding contact portions can be prevented from being degraded by water and mud.

In one preferred form of the power transmission structure, the through hole has a third passage portion disposed at that side of the second passage portion close to the first lid member, and an inner diameter of that end of the third passage portion close to the second passage portion is larger than an inner diameter of that end of the second passage portion close to the first lid member.

In this form of the invention, the through hole has the third passage portion disposed at that side of the second passage portion close to the first lid member, and the inner diameter of that end of the third passage portion close to the second passage portion is larger than the inner diameter of that end of the second passage portion close to the first lid member, and therefore the lubricant existing within the third passage portion is less liable to flow into the second passage portion. Therefore, the leakage of the lubricant to the exterior through the air vent hole of the first passage portion can be suppressed, and also the amount of the lubricant degraded by muddy water can be markedly reduced.

In another preferred form of the power transmission structure, at least one of the second and third passage portions is a flaring passage portion gradually increasing in inner diameter in the axial direction toward the first lid member.

In this form of the invention, at least one of the second and third passage portions is the flaring passage portion gradually increasing in inner diameter in the axial direction toward the first lid member, and therefore the lubricant within the flaring passage portion can be moved in the axial direction toward the first lid member by a centrifugal force produced by the rotation of the male yoke. Therefore, the leakage of the lubricant to the exterior through the air vent hole of the first passage portion can be further suppressed, and also the amount of the lubricant degraded by muddy water can be further reduced.

In a further preferred form of the power transmission structure, the first passage portion is gradually increasing in inner diameter in the axial direction away from the second passage portion.

In this form of the invention, the first passage portion is gradually increasing in inner diameter in the axial direction away from the second passage portion, and therefore muddy water once intruded into the through hole by a centrifugal force produced by the rotation of the male yoke can be moved toward the air vent hole, and can be discharged to the exterior through the air vent hole. Therefore, the degrading of the lubricant (within the through hole) by the muddy water can be suppressed.

Effect of the Invention

In power transmission structure of the invention, the open end of the sleeve remote from the connecting portion of the male yoke is closed or sealed by the first lid member, and therefore the lubricant sealed in the lubricant sealing space formed by the axial end face of the male yoke, the first lid member and the sleeve will not leak from the open end of the sleeve remote from the connecting portion. Therefore, a sufficient amount of lubricant to prevent the seizure of the sliding contact portions of the male yoke and sleeve can be caused to exist in the vicinity of these sliding contact portions for a long period of time, and therefore the seizure of the sliding contact portions can positively be prevented for a long period of time.

Furthermore, for example, in the case where the second sleeve is fixed by welding or other means to the outer peripheral surface of that axial end portion of the sleeve close to the first lid member, the lubricant will not leak into the second sleeve, and therefore the whirling of the power transmission structure due to the leakage of the lubricant into the second sleeve will not occur.

Furthermore, in the power transmission structure of the invention, the second lid member has the air vent hole extending therethrough in the axial direction and disposed so as to partially overlap with the inner peripheral surface of the first passage portion in the axial direction. Therefore, by flowing the air into and out of the first passage portion through this air vent hole, the air pressure within the lubricant sealing space can be kept generally constant, and therefore the male yoke can be smoothly slid relative to the sleeve.

Furthermore, in the power transmission structure of the invention, the through hole has the second passage portion disposed at that side of the first passage portion close to the first lid member, and that end of this second passage portion close to the first passage portion is smaller in inner diameter than that end of the first passage portion close to the first lid member. Therefore, even when mud and water intrude into the through hole from the exterior through the air vent hole, the mud and water are less liable to intrude into the second passage portion, thus suppressing the arrival of the mud and water at the sliding contact portions of the male yoke and sleeve. And besides, water and mud are higher in specific gravity than the lubricant, and therefore such water and mud once intruded into the through hole can be discharged to the exterior through the air vent hole by a centrifugal force produced by the rotation of the male yoke, and the lubricant can be prevented from being degraded by water and mud.

BEST MODE FOR CARRYING OUT THE INVENTION

Preferred embodiments of the present invention will now be described in detail with reference to the drawings.

First Embodiment

Figure 1:
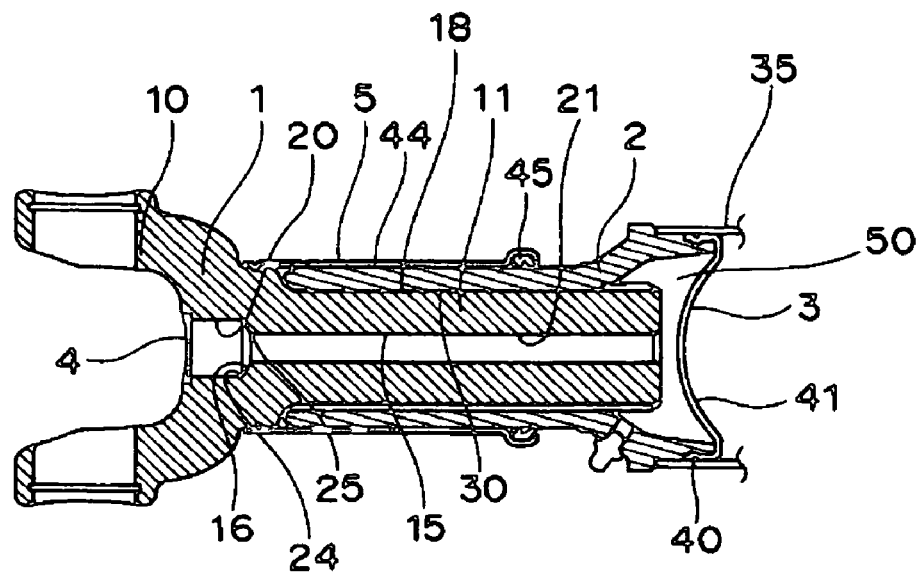
FIG. 1 is an axial cross-sectional view of a first embodiment of a power transmission structure of the present invention.

FIG. 1 is an axial cross-sectional view of a first embodiment of a power transmission structure of the invention.

This power transmission structure forms part of a propeller shaft. This power transmission structure comprises a male yoke 1, a sleeve 2, a first lid member 3, a second lid member 4, and an oil seal 5.

The male yoke 1 includes a shaft portion 11, and a connecting portion 10 integrally formed at one end of the shaft portion 11. A spline (not shown) are formed at an outer peripheral surface 18 of the shaft portion 11, and extend in the axial direction. On the other hand, a universal joint (not shown) is adapted to be connected to the connecting portion 10. A transmission or a differential gear is adapted to be connected to the connecting portion 10 via the universal joint and other parts.

The male yoke 1 has a through hole 15 extending therethrough in the axial direction. This through hole 15 has a center axis coinciding with a center axis of the shaft portion 11. The through hole 15 has a first passage portion 20 and a second passage portion 21. The first passage portion 20 and the second passage portion 21 communicate with each other via a step portion 16 of a generally conical shape (or tapering shape). The first passage portion 20 is disposed closer to the connecting portion 10 of the male yoke 1 in the axial direction than the second passage portion 21 is. As shown in FIG. 1, an inner diameter of that end 24 of the first passage portion 20 close to the second passage portion 21 is larger than an inner diameter of that end 25 of the second passage portion 21 close to the first passage portion 20.

The sleeve 2 is fitted on the male yoke 1 so as to slide relative thereto in the axial direction. More specifically, the sleeve 2 has a spline (not shown) formed at its inner peripheral surface, and the spline of the sleeve 2 are spline-fitted to the spline of the male yoke 1. One end portion of a second sleeve 35 is fixed by welding to an outer peripheral surface of that axial end portion of the sleeve 2 remote from the connecting portion 10.

The first lid member 3 includes an engagement portion 40, and a disk-like body portion 41 extending generally radially to be integrally connected to the engagement portion 40. The engagement portion 40 is fitted on and fixed to the outer peripheral surface of the end portion of the sleeve 2 remote from the connecting portion 10. The first lid member 3 completely closes or seals an open end (opening) of the sleeve 2 remote from the connecting portion 10.

The second lid member 4 has a generally disk-shape, and closes that open end of the through hole 15 remote from the first lid member 3. The second lid member 4 is fixed by fitting or caulking to an inner peripheral surface of the axial end portion of the through hole 15 remote from the first lid member 3.

The oil seal 5 comprises a core metal portion 44 of a tubular shape, and an elastic portion 45. The elastic portion 45 is fitted in an inner peripheral surface of the core metal portion 44 at one axial end portion thereof. The elastic portion 45 projects radially inwardly from the inner peripheral surface of the core metal portion 44. A center axis of the core metal portion 44 generally coincides with the center axis of the shaft portion 11. The other axial end portion of the core metal portion 44 is fitted on and fixed to a portion of the outer peripheral surface of the shaft portion 11. On the other hand, the one axial end portion of the core metal portion 44 is held in contact with the cylindrical outer peripheral surface of the sleeve 2 through the elastic portion 45. The elastic portion 45 has a seal lip, and this seal lip is held in sliding contact with the cylindrical outer peripheral surface of the sleeve 2 so as to slide relative thereto in the axial direction. Lubricant is filled in a space formed by an end face of the male yoke 1, the inner peripheral surface of the sleeve 2 and the first lid member 3 and also in the through hole 15. The lubricant is thus caused to exist between sliding contact portions of the male yoke 1 and sleeve 2, thereby preventing seizure of these sliding contact portions. The oil seal 5 serves to prevent the lubricant (which prevents the seizure of the sliding contact portions) from leaking to the exterior.

Figure 2:
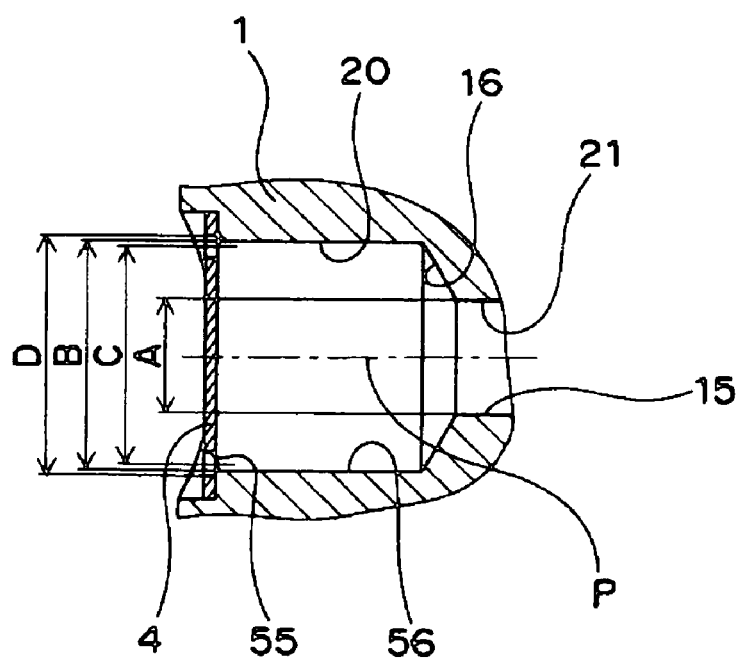
FIG. 2 is a fragmentary cross-sectional view showing a first passage portion of FIG. 1 and its vicinities on an enlarged scale.

FIG. 2 is a fragmentary cross-sectional view showing the first passage portion 20 of FIG. 1 and its vicinities on an enlarged scale.

The second lid member 4 has a plurality of air vent holes 55 extending therethrough in the axial direction. Each of the air vent holes 55 is disposed so as to partially overlap with a portion (end portion) of an inner peripheral surface 56 of the first passage portion 20 in the axial direction, with no clearance formed therebetween in the axial direction. More specifically, as shown in FIG. 2, a radially-outermost portion of an inner peripheral edge of each air vent hole 55 is disposed radially outwardly of the inner peripheral surface 56 of the first passage portion 20, while a radially-innermost portion of the inner peripheral edge of the air vent hole 55 is disposed radially inwardly of the inner peripheral surface 56 of the first passage portion 20. Namely, the peripheral edge of the end portion of the inner peripheral surface 56 of the first passage portion 20 is disposed so as to overlap with an opening of each air vent hole 55 in the axial direction. The plurality of air vent holes 55 formed through the second lid member 4 are arranged at predetermined intervals in the circumferential direction.

In FIG. 2, reference character A denotes an inner diameter of the second passage portion 21, reference character B denotes an inner diameter of the first passage portion 20, reference character C denotes a diameter of a pitch circle of the air vent holes 55, and reference character D represents a length twice larger than the distance between the radially-outermost portion of the inner peripheral edge of each air vent hole 55 and the center axis P of the through hole 15. As shown in FIG. 2, the relation, $A<C<B<D$, is established.

In the power transmission structure of the first embodiment, the open end of the sleeve 2 remote from the connecting portion 10 of the male yoke 1 is closed or sealed by the first lid member 3, and therefore even when the male yoke 1 slides in the axial direction to overlap the sleeve 2 in a large amount, so that the volume of the grease sealing space 50 formed by the axial end face of the male yoke 1, the first lid member 3 and the sleeve 2 is decreased, the lubricant (e.g. grease) will not leak into the second sleeve 35 through the first lid member 3. Therefore, a sufficient amount of grease to prevent the seizure of the sliding contact portions of the male yoke 1 and sleeve 2 can be caused to exist in the vicinity of these sliding contact portions for a long period of time, and therefore the seizure of the sliding contact portions can positively be prevented for a long period of time. And besides, since the grease will not leak into the second sleeve 35, the whirling of the power transmission structure due to leakage of the grease into the second sleeve 35 will not occur.

Furthermore, in the power transmission structure of the first embodiment, the second lid member 4 has the air vent holes 55 which extend therethrough in the axial direction, and are disposed so as to overlap with the end portion of the inner peripheral surface 56 of the first passage portion 20 in the axial direction. Therefore, the air can be caused to flow into the first passage portion 20 from the exterior through these air vent holes 55, and also the air can be caused to flow from the first passage portion 20 to the exterior. Therefore, the air pressure within the grease sealing space 50 can be kept generally constant, and therefore the male yoke 1 can be smoothly slid relative to the sleeve 2.

Furthermore, in the power transmission structure of the first embodiment, the through hole 15 has the second passage portion 21 which is disposed at that side of the first passage portion 20 close to the first lid member 3, and the end 25 of the second passage portion 21 close to the first passage portion 20 is smaller in inner diameter than the end 24 of the first passage portion 20 close to the first lid member 3. Therefore, even when mud and water intrude into the through hole 15 through the air vent holes 55 from the exterior of the male yoke 1, the mud and water are less liable to intrude into the second passage portion 21, thus suppressing the arrival of the mud and water at the sliding contact portions of the male yoke 1 and sleeve 2. And besides, the air vent holes 55 are disposed so as to partially overlap with the inner peripheral surface of the first passage portion 20 in the axial direction, with no clearance formed therebetween in the axial direction, and therefore water and mud once intruded into the first passage portion 20 can be discharged to the exterior through the air vent holes 55 by a centrifugal force produced by the rotation of the male yoke 1. Therefore, the grease can be prevented from being degraded by water and mud.

In the power transmission structure of the first embodiment, the inner peripheral surface of the first passage portion 20 is the cylindrical surface. However, in the invention, the inner peripheral surface of the first passage portion may have such a shape (e.g. a generally conical shape) that the inner diameter of this inner peripheral surface is gradually increasing away from the second passage portion. With this construction, foreign matters (such as muddy water, etc.) once intruded into the male yoke can be flowed out to the exterior through the air vent holes in an accelerated manner by a pump effect achieved by a centrifugal force produced by the rotation of the male yoke 1, and therefore the degrading of the grease can be prevented.

Furthermore, in the power transmission structure of the first embodiment, although the first lid member 3 is fitted on and fixed to the outer peripheral surface of the axial end portion of the sleeve 2, the first lid member may be so modified as to be fitted into and fixed to the inner peripheral surface of the axial end portion of the sleeve. Furthermore, the first lid member may be fixed to the sleeve by press-fitting, or may be fixed to the sleeve by press-fitting and caulking. The first lid member can be fixed to the sleeve by any suitable fixing means in so far as the first lid member can seal the open end of the sleeve remote from the connecting portion.

Furthermore, in the power transmission structure of the first embodiment, the first passage portion 20 and the second passage portion 21 are continuous with each other via the step portion 16 of a generally conical shape (tapering shape). However, in the invention, the first and second passage portions can be interconnected by a modified step portion of any other suitable shape than the conical shape such for example as a flat surface-like step portion extending generally perpendicular to the center axis of the shaft portion of the male yoke.

Second Embodiment

Figure 3:
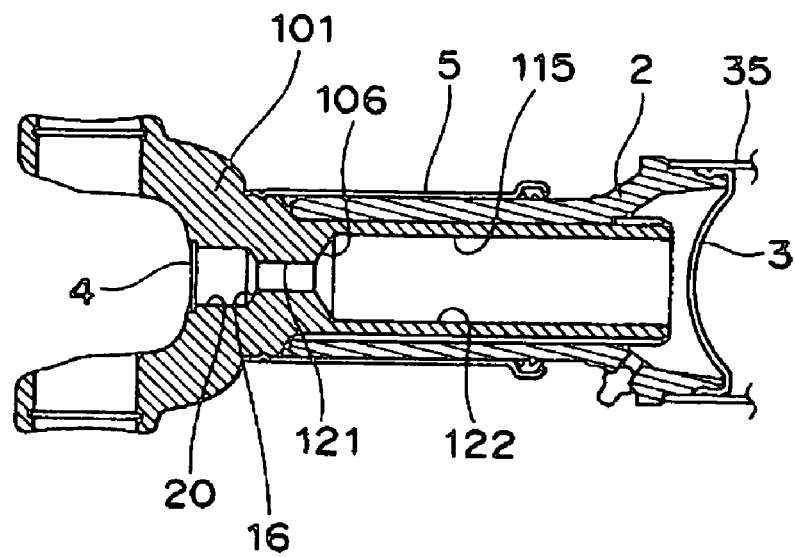
FIG. 3 is an axial cross-sectional view of a second embodiment of a power transmission structure of the invention.

FIG. 3 is an axial cross-sectional view of a second embodiment of a power transmission structure of the invention.

The power transmission structure of the second embodiment differs from the power transmission structure of the first embodiment in that an axial length of a second passage portion 121 of a through hole 115 is smaller than the axial length of the second passage portion 21 and that the through hole 115 has a third passage portion 122 disposed at that side of the second passage portion 121 close to a first lid member 3, the third passage portion 122 being larger in inner diameter than a first passage portion 20.

In the power transmission structure of the second embodiment, those constituent portions identical to those of the power transmission structure of the first embodiment will be designated by identical reference numerals, respectively, and description thereof will be omitted. Also, in the power transmission structure of the second embodiment, description of advantageous effects and modified examples similar to those of the power transmission structure of the first embodiment will be omitted, and only those constructions, advantageous effects and modified examples different from those of the power transmission structure of the first embodiment will be described.

In the power transmission structure of the second embodiment, the third passage portion 122 is formed at that side of the second passage portion 121 close to the first lid member 3, and is continuous with that end of the second passage portion 121 close to the first lid member 3 through a step portion 106 of a generally conical shape (tapering shape), the third passage portion 122 being larger in inner diameter than the first passage portion 20.

In the power transmission structure of the second embodiment, the through hole 115 has the third passage portion 122 disposed at that side of the second passage portion 121 close to the first lid member 3, and the inner diameter of that end of the third passage portion 122 close to the second passage portion 121 is larger than the inner diameter of that end of the first passage portion 20 close to the first lid member 3. Therefore, grease existing in the third passage portion 122 of a male yoke 101 is less liable to flow into the second passage portion 121. Therefore, the leakage of the grease to the exterior via air vent holes of the first passage portion 20 can be suppressed, and also the amount of the grease degraded by muddy water can be markedly reduced.

In the power transmission structure of the second embodiment, the second passage portion 121 and the third passage portion 122 are continuous with each other via the step portion 106 of a generally conical shape. However, in the invention, the second and third passage portions can be interconnected by a modified step portion of any other suitable shape than the conical shape such for example as a flat surface-like step portion extending generally perpendicular to a center axis of a shaft portion of the male yoke.

Furthermore, in the power transmission structure of the second embodiment, the end of the third passage portion 122 close to the second passage portion 121 is larger in inner diameter than the end of the first passage portion 20 close to the first lid member 3. However, in the invention, the end of the third passage portion close to the second passage portion may be smaller in inner diameter than the end of the first passage portion close to the first lid member in so far as the end of the third passage portion close to the second passage portion is larger in inner diameter than the end of the second passage portion close to the third passage portion. In so far as only the requirement that the inner diameter of that end of the third passage portion close to the second passage portion is larger than the inner diameter of that end of the second passage portion close to the third passage portion is met, the movement of the grease from the third passage portion to the second passage portion can be suppressed.

In the power transmission structure of the second embodiment, the second passage portion 121 has a cylindrical inner peripheral surface. However, in the construction of the invention in which there are provided the first passage portion, the second passage portion disposed closer to the first lid member than the first passage portion is, and the third passage portion disposed closer to the first lid member than the second passage portion is, the inner peripheral surface of at least one of the second and third passage portions may be flaring (that is, may be gradually increasing in inner diameter) in the axial direction toward the first lid member. In this case, the grease within at least one of the second and third passage portions can be moved in the axial direction toward the first lid member by a centrifugal force produced by the rotation of the male yoke, so that the leakage of the grease to the exterior through the air vent holes of the first passage portion can be further suppressed, and besides the amount of the grease degraded by muddy water can be reduced.

Third Embodiment

Figure 4:
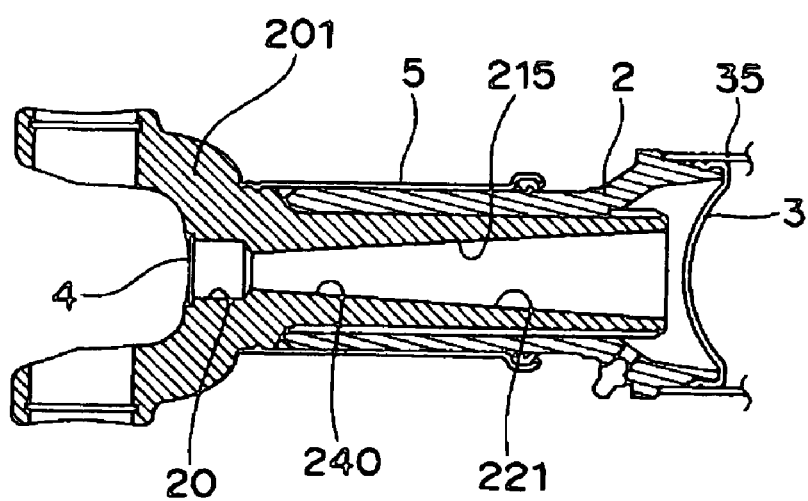
FIG. 4 is an axial cross-sectional view of a third embodiment of a power transmission structure of the invention.

FIG. 4 is an axial cross-sectional view of a third embodiment of a power transmission structure of the invention.

The power transmission structure of the third embodiment differs from the power transmission structure of the first embodiment (in which the second passage portion has the cylindrical inner peripheral surface) in that a second passage portion 221 of a through hoe 215 has a generally-conical inner peripheral surface 240 gradually increasing in inner diameter in an axial direction toward a first lid member 3.

In the power transmission structure of the third embodiment, those constituent portions identical to those of the power transmission structure of the first embodiment will be designated by identical reference numerals, respectively, and description thereof will be omitted. Also, in the power transmission structure of the third embodiment, description of advantageous effects and modified examples similar to those of the power transmission structure of the first embodiment will be omitted, and only those constructions, advantageous effects and modified examples different from those of the power transmission structure of the first embodiment will be described.

In the third embodiment, the second passage portion 221 of the through hole 215 of a male yoke 201 has the generally-conical inner peripheral surface 240 gradually increasing in inner diameter in the axial direction toward the first lid member 3.

In the power transmission structure of the third embodiment, grease within the second passage 221 can be moved in the axial direction toward the first lid member 3 by a centrifugal force produced by the rotation of the male yoke 201, and therefore the leakage of the grease to the exterior through air vent holes of a first passage portion 20 can be further suppressed, and besides the amount of the grease degraded by muddy water can be reduced.

The invention claimed is:

1. A power transmission structure comprising:
a male yoke including a shaft portion, a through hole extending through the shaft portion generally at a center portion thereof in an axial direction, and a connecting portion integrally formed at one end of the shaft portion;
a sleeve spline-fitted to the shaft portion so as to allow a sliding movement between the male yoke and the sleeve;
a first lid member which closes an open end of the sleeve remote from the connecting portion of the male yoke, and is fixed to the sleeve; and
a second lid member which closes an open end of the through hole closest to the connecting portion, and is fixed to the male yoke;
wherein the through hole includes:
a first passage portion; and
a second passage portion which is disposed at a side of the first passage portion closest to the first lid member, an inner diameter of an end of the second passage portion closest to the first passage portion being smaller than an inner diameter of an end of the first passage portion closest to the first lid member, and
wherein the second lid member includes an air vent hole that extends therethrough in the axial direction and is disposed so as to partially overlap with an inner peripheral surface of the first passage portion in the axial direction.

2. The power transmission structure according to claim 1, wherein a portion of the first passage portion is gradually increasing in inner diameter in the axial direction away from the second passage portion.

3. The power transmission structure according to claim 1, wherein the second passage portion comprises a flaring passage portion gradually increasing in inner diameter in the axial direction toward the first lid member.

4. The power transmission structure according to claim 3, wherein a portion of the first passage portion is gradually increasing in inner diameter in the axial direction away from the second passage portion.

5. The power transmission structure according to claim 1, wherein the through hole includes a third passage portion disposed at a side of the second passage portion closest to the first lid member, and an inner diameter of an end of the third passage portion closest to the second passage portion is larger than an inner diameter of an end of the second passage portion closest to the first lid member.

6. The power transmission structure according to claim 5, wherein a portion of the first passage portion is gradually increasing in inner diameter in the axial direction away from the second passage portion.

7. The power transmission structure according to claim 5, wherein at least one of the second and third passage portions comprises a flaring passage portion gradually increasing in inner diameter in the axial direction toward the first lid member.

8. The power transmission structure according to claim 7, wherein a portion of the first passage portion is gradually increasing in inner diameter in the axial direction away from the second passage portion.

9. A power transmission structure comprising:
a male yoke including a shaft portion, a through hole extending through the shaft portion generally at a center portion thereof in an axial direction, and a connecting portion integrally formed at one end of the shaft portion;
a sleeve fitted to the shaft portion so as to allow a sliding movement between the male yoke and the sleeve;
a first lid member which closes an open end of the sleeve remote from the connecting portion of the male yoke, and is fixed to the sleeve; and
a second lid member which closes an open end of the through hole closest to the connecting portion, and is fixed to the male yoke;
wherein the through hole includes:
a first passage portion; and
a second passage portion which is disposed at a side of the first passage portion closest to the first lid member, an inner diameter of an end of the second passage portion closest to the first passage portion being smaller than an inner diameter of an end of the first passage portion closest to the first lid member, and
wherein the second lid member includes an air vent hole that extends therethrough in the axial direction and is disposed so as to partially overlap with an inner peripheral surface of the first passage portion in the axial direction.

* * * * *